United States Patent
Kobayashi et al.

(10) Patent No.: US 8,945,789 B2
(45) Date of Patent: Feb. 3, 2015

(54) SOLID OXIDE FUEL CELL

(75) Inventors: Ayano Kobayashi, Nagoya (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 128 days.

(21) Appl. No.: 13/421,969

(22) Filed: Mar. 16, 2012

(65) Prior Publication Data
US 2012/0237849 A1 Sep. 20, 2012

(30) Foreign Application Priority Data

Mar. 18, 2011 (JP) .................................. 2011-060709
Dec. 26, 2011 (JP) .................................. 2011-282804
Mar. 13, 2012 (JP) .................................. 2012-056217

(51) Int. Cl.
*H01M 8/10* (2006.01)
*H01M 4/86* (2006.01)

(52) U.S. Cl.
CPC .......... *H01M 4/86* (2013.01); *H01M 8/10* (2013.01); *Y02E 60/521* (2013.01); *Y02E 60/525* (2013.01)
USPC ............ 429/480; 429/484; 429/491; 429/527; 429/532

(58) Field of Classification Search
CPC ....... H01M 8/10; H01M 8/12; H01M 8/1213; H01M 2300/0074; H01M 2300/0077; H01M 4/86; H01M 4/8605; H01M 4/0404; H01M 4/0407; H01M 4/0469; H01M 4/134; H01M 2004/02; H01M 2004/021; Y02E 60/521; Y02E 60/525
USPC ......... 429/479, 480, 482, 484, 485, 486, 488, 429/489, 490, 491, 495, 496, 502, 505, 527, 429/529, 532, 523, 532.534
See application file for complete search history.

(56) References Cited

U.S. PATENT DOCUMENTS

| 6,692,855 B1 * | 2/2004 | Aizawa et al. ................ 429/479 |
| 2002/0127351 A1 * | 9/2002 | Takikawa et al. ............. 427/569 |
| 2008/0124598 A1 * | 5/2008 | Backhaus-Ricoult et al. .. 429/27 |

FOREIGN PATENT DOCUMENTS

| EP | 1 225 648 A2 | 7/2002 |
| EP | 1 768 208 A2 | 3/2007 |
| JP | 8-162120 | 6/1996 |

(Continued)

OTHER PUBLICATIONS

International Search Report mailed May 15, 2012.
(Continued)

*Primary Examiner* — Mark F Huff
*Assistant Examiner* — Omar Kekia
(74) *Attorney, Agent, or Firm* — Burr & Brown, PLLC

(57) ABSTRACT

The present invention provides a solid oxide fuel cell (SOFC) including a porous fuel electrode which allows reaction of a fuel gas to proceed and which is formed of Ni and YSZ, a porous air electrode which allows reaction of an oxygen-containing gas to proceed, and a dense solid electrolyte membrane which is provided between the fuel electrode and the air electrode and which has an interface with the fuel electrode. In the fuel electrode, Ni grains present in a region located within 3 μm from the interface (i.e., a "near-interface region") have a mean size of 0.28 to 0.80 μm, YSZ grains present in the near-interface region have a mean size of 0.28 to 0.80 μm, and pores present in the near-interface region have a mean size of 0.10 to 0.87 μm. Thus, the fuel electrode of the SOFC exhibits low reaction resistance.

7 Claims, 10 Drawing Sheets

(56) References Cited

FOREIGN PATENT DOCUMENTS

| | | |
|---|---|---|
| JP | 9-147876 | 6/1997 |
| JP | 2001-102060 | 4/2001 |
| JP | 2003-45446 | 2/2003 |
| JP | 2005-339905 | 12/2005 |
| JP | 2007-200664 | 8/2007 |
| JP | 2008-226789 | 9/2008 |
| WO | 2008/116312 A1 | 10/2008 |

OTHER PUBLICATIONS

Thydén, K., et al. "*Microstructural characterization of SOFC Ni-YSZ anode composites by low-voltage scanning electron microscopy*" Solid State Ionics 178 (2008), p. 1984-1989.

European Search Report, European Application No. 12760450.2, dated Jun. 23, 2014 (6 pages).

* cited by examiner

SOLID OXIDE FUEL CELL

BACKGROUND OF THE INVENTION

1. Field of the Invention

The present invention relates to a solid oxide fuel cell (SOFC).

2. Description of Related Art

An SOFC includes a porous fuel electrode for allowing reaction of a fuel gas to proceed; a porous air electrode for allowing reaction of an oxygen-containing gas to proceed; and a dense solid electrolyte membrane provided between the fuel electrode and the air electrode (see, for example, Japanese Patent Application Laid-Open (kokai) No. 2008-226789). In the SOFC, at a high temperature (e.g., 500 to 1,000° C.), when a fuel gas (e.g., hydrogen gas) is supplied to the fuel electrode, and an oxygen-containing gas (e.g., air) is supplied to the air electrode, chemical reactions shown in the following formulas (1) and (2) occur. Thus, a potential difference is generated between the fuel electrode and the air electrode. This potential difference is based on the oxygen ion conductivity of the solid electrolyte.

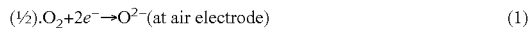

$$(1/2).O_2 + 2e^- \rightarrow O^{2-} \text{ (at air electrode)} \qquad (1)$$

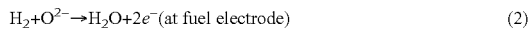

$$H_2 + O^{2-} \rightarrow H_2O + 2e^- \text{ (at fuel electrode)} \qquad (2)$$

The following description will be focused on the reaction at the fuel electrode (the aforementioned formula (2)). The porous fuel electrode is formed of, for example, Ni (nickel) and YSZ (yttria-stabilized zirconia). In this fuel electrode, Ni serves as a "catalyst for dissociating hydrogen molecules ($H_2$) into hydrogen ions ($2H^+$)," and also as a "substance for conducting the generated electrons ($2e^-$)." YSZ serves as a "substance for conducting oxygen ions ($O^{2-}$)." Pores serve as "passages for hydrogen molecules ($H_2$) and the generated water ($H_2O$)." That is, the reaction at the fuel electrode greatly depends on the states of Ni grains, YSZ grains, and pores present in the fuel electrode (particularly in a region of the below-described active layer of the fuel electrode in the vicinity of the interface between the active layer and the solid electrolyte membrane). Therefore, conceivably, the reaction resistance of the fuel electrode can be reduced by controlling the states (e.g., grain sizes) of Ni grains, YSZ grains, and pores present in the fuel electrode.

Hitherto, when a cross section of an SOFC cell sample in a thickness direction (layer-stacking direction) is observed under a scanning electron microscope (SEM observation), "Ni grains or YSZ grains" are easy to distinguish from pores, but Ni grains are very difficult to distinguish from YSZ grains. This is attributed to the high light-dark contrast (more specifically, light-dark contrast in a SEM backscattered electron image) between "Ni grains or YSZ grains" and pores, and the low light-dark contrast between Ni grains and YSZ grains.

In contrast, in recent years, there has been reported an SEM observation technique capable of distinguishing Ni grains from YSZ grains; i.e., capable of distinguishing Ni gains, YSZ grains, and pores from one another. Such a "new SEM observation technique" is described in detail in Solid State Ionics 178 (2008) 1984.

The present inventors have observed cross sections of various fuel electrodes through this "new SEM observation technique," and have focused particularly on a "region of a fuel electrode in the vicinity of the interface between the fuel electrode and a solid electrolyte membrane," which region is considered to greatly affect the aforementioned reaction at the fuel electrode. As a result, the present inventors have found that a combination of the sizes of Ni grains, YSZ grains, and pores in the aforementioned region greatly affects the reaction resistance of the fuel electrode. Also, the present inventors have found that an appropriate combination of the sizes of Ni grains, YSZ grains, and pores in the aforementioned region is required for reducing the reaction resistance of the fuel electrode.

SUMMARY OF THE INVENTION

In view of these findings, an object of the present invention is to provide an SOFC including a fuel electrode exhibiting low reaction resistance.

The SOFC of the present invention comprises a "porous fuel electrode which allows reaction of a fuel gas to proceed and which is formed of Ni and a material exhibiting oxygen ion conductivity (hereinafter may be referred to as an "oxygen-ion-conductive material") (oxide ceramic material)"; a "porous air electrode which allows reaction of an oxygen-containing gas to proceed"; and a "dense solid electrolyte membrane which is provided between the fuel electrode and the air electrode and which has an interface with the fuel electrode."

Examples of the oxygen-ion-conductive material include yttria-stabilized zirconia (YSZ) and gadolinium-doped ceria (GDC). The fuel electrode and the solid electrolyte membrane are preferably formed through co-firing.

A characteristic feature of the SOFC of the present invention resides in that, in the fuel electrode, Ni grains present in a region located within 3 μm from the aforementioned interface (hereinafter, the region may be referred to as a "near-interface region") have a mean size of 0.28 to 0.80 μm; grains of the oxygen-ion-conductive material present in the region have a mean size of 0.28 to 0.80 μm; and pores present in the region have a mean size of 0.10 to 0.87 μm.

The present inventors have observed cross sections of various fuel electrodes through the aforementioned "new SEM observation technique," and, as a result, have found that the fuel electrode having the aforementioned structure exhibits low reaction resistance (details will be described hereinbelow).

In the aforementioned SOFC, preferably, Ni grains present in the aforementioned region and facing the solid electrolyte membrane have a mean size of 0.31 to 0.70 μm; grains of the oxygen-ion-conductive material present in the region and facing the solid electrolyte membrane have a mean size of 0.32 to 0.78 μm; and pores of the fuel electrode present in the region and facing the solid electrolyte membrane have a mean size of 0.15 to 0.80 μm. The present inventors have also found that the fuel electrode having this structure exhibits lower reaction resistance (details will be described hereinbelow). As used herein, the expression "grains (pores) facing the solid electrolyte membrane" refers to grains (pores) which are contained in the fuel electrode and which can be observed (under, for example, an SEM) on the side of the solid electrolyte membrane under the assumption that the solid electrolyte membrane is absent. In other words, the expression "grains (pores) facing the solid electrolyte membrane" refers to grains (pores) which are present at "the end portion (in a thickness direction) of the fuel electrode in the vicinity of the aforementioned interface" and which are distributed along the interface.

When the aforementioned "new SEM observation technique" is employed, Ni grains, YSZ grains, and pores can be distinguished from one another, and also "an Ni grain which is present alone without being united with adjacent Ni grains" (non-percolating Ni grain, hereinafter may be referred to as "isolated Ni grain") can be distinguished from "an Ni grain which is united with adjacent Ni grains" (percolating Ni grain, hereinafter may be referred to as "continuous Ni grain"). Such distinction is also described in detail in "Solid State Ionics 178 (2008) 1984."

The present inventors have observed cross sections of various fuel electrodes through the aforementioned "new SEM observation technique," and, as a result, have also found that when the ratio of "the total volume of isolated Ni grains present in the aforementioned region" to "the total volume of all the Ni grains (i.e., isolated Ni grains+continuous Ni grains) present in the region" is (2% or more and) 40% or less, the reaction resistance of the fuel electrode is further reduced (details will be described hereinbelow).

DETAILED DESCRIPTION OF THE INVENTION

Configuration

Figure 1:
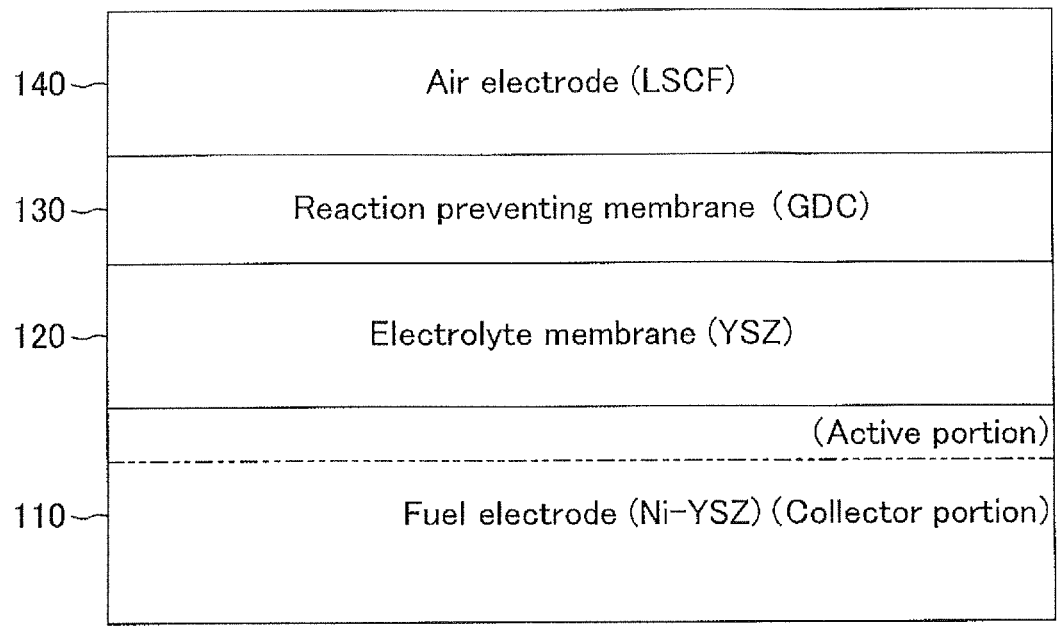
FIG. 1 is a schematic representation of the configuration of an SOFC according to an embodiment of the present invention.

FIG. 1 schematically shows the configuration of an SOFC cell according to an embodiment of the present invention. The SOFC cell is a layered product including a fuel electrode 110, an electrolyte membrane 120 stacked on the fuel electrode 110, a reaction preventing membrane 130 stacked on the electrolyte membrane 120, and an air electrode 140 stacked on the reaction preventing membrane 130. As viewed from above, the cell is in the form of, for example, square (each side: 1 to 30 cm), rectangle (longer side: 5 to 30 cm, shorter side: 3 to 15 cm), or circle (diameter: 1 to 30 cm). The cell has a thickness of 0.1 to 3 mm.

The fuel electrode 110 (anode) is a porous, thin plate-like fired product formed of, for example, nickel oxide (NiO) and yttria-stabilized zirconia (YSZ). The fuel electrode 110 has a thickness of 0.1 to 3 mm. The fuel electrode 110 has the largest thickness of all the constitutive members of the cell, and the fuel electrode 110 also serves as a support substrate of the cell. The member having the largest thickness of all the constitutive members of the cell may be a member other than the fuel electrode 110. The fuel electrode 110 is imparted with electrical conductivity through a well-known reduction treatment (e.g., treatment for reducing NiO to Ni). The SOFC operates in the state where the fuel electrode 110 exhibits electrical conductivity.

The fuel electrode 110 may have a two-layer structure including an active portion (active layer) which is in contact with the below-described electrolyte membrane 120, and a collector portion (collector layer) (i.e., the remaining portion of the fuel electrode) (see FIG. 1). The active portion of the fuel electrode may be formed of, for example, nickel oxide (NiO) and yttria-stabilized zirconia (YSZ, 8YSZ). Alternatively, the active portion may be formed of nickel oxide (NiO) and gadolinium-doped ceria (GDC). The collector portion of the fuel electrode may be formed of, for example, nickel oxide (NiO) and yttria-stabilized zirconia (YSZ, 8YSZ). Alternatively, the collector portion may be formed of nickel oxide (NiO) and yttria ($Y_2O_3$), or may be formed of nickel oxide (NiO) and calcia-stabilized zirconia (CSZ). The active portion (active layer) of the fuel electrode has a thickness of 5 to 30 μm, and the collector portion (collector layer) of the fuel electrode has a thickness of 50 to 500 μm.

Thus, the collector portion of the fuel electrode is formed of a material exhibiting electron conductivity. Meanwhile, the active portion of the fuel electrode is formed of a material exhibiting electron conductivity and a material exhibiting oxygen ion conductivity. "The ratio of the volume of the material exhibiting oxygen ion conductivity to the total volume of the active portion of the fuel electrode (exclusive of the volume of pores)" is greater than "the ratio of the volume of the material exhibiting oxygen ion conductivity to the total volume of the collector portion of the fuel electrode (exclusive of the volume of pores)."

The electrolyte membrane 120 is a dense, thin plate-like fired product formed of a zirconium-containing material (e.g., YSZ). The electrolyte membrane 120 has a thickness of 3 to 30 μm.

The reaction preventing membrane 130 is a thin plate-like fired product formed of ceria. Specific examples of the ceria include GDC (gadolinium-doped ceria) and SDC (samarium-doped ceria). The reaction preventing layer 130 is provided between the electrolyte membrane 120 and the air electrode 140 for preventing formation of a high resistance layer between the electrolyte membrane 120 and the air electrode 140 due to reaction between zirconium (Zr) contained in the electrolyte membrane 120 and strontium (Sr) contained in the air electrode 140 during production of the cell or during operation of the SOFC. The reaction preventing membrane 130 has a thickness of 3 to 20 μm.

The air electrode 140 (cathode) is a porous, thin plate-like fired product formed of, for example, a perovskite-type oxide. The perovskite-type oxide may be, for example, lanthanum strontium cobalt ferrite (LSCF, $(La,Sr)(Co,Fe)O_3$), lanthanum strontium ferrite (LSF, $(La,Sr)FeO_3$), lanthanum nickel ferrite (LNF, $La(Ni,Fe)O_3$), or lanthanum strontium cobaltite (LSC, $(La,Sr)CoO_3$). The air electrode 140 has a thickness of 10 to 100 μm.

In the specification, the configuration of the SOFC cell shown in FIG. 1 has been generally described. A plurality of SOFC cells may be electrically connected in series via a member for power collection (interconnector), whereby high output can be achieved. When a plurality of SOFC cells are electrically connected in series, there may be employed a mode in which a plurality of power generators, each being a "layered product including a fuel electrode, an electrolyte membrane, and an air electrode," are provided in a layer-stacking direction (so-called "vertical stripe type"), or a mode in which the power generators are provided at different positions on the surface of a plate-like support (so-called "horizontal stripe type").

(Production Method)

Next will be described a method for producing the SOFC cell shown in FIG. 1. Hereinafter, the term "molded product" refers to a product which has not yet been fired. Firstly, a molded product for the fuel electrode 110 was formed as follows. Specifically, NiO powder was mixed with YSZ powder, and the resultant mixture was mixed with polyvinyl alcohol (PVA) serving as a binder, to thereby prepare a slurry. The slurry was dried with a spray dryer, followed by granulation, to thereby produce powder for the fuel electrode. The powder was subjected to die pressing molding, to thereby form a molded product for the fuel electrode 110.

When the fuel electrode 110 is formed of the aforementioned "two-layer structure including an active portion and a collector portion," firstly, a molded product for the collector portion is formed. The molded product for the collector portion is formed through, for example, die pressing molding of powder for the collector portion prepared in a manner similar to that described above. Subsequently, a molded product for the active portion is formed and stacked on the top surface of the molded product for the collector portion as follows. Specifically, water and a binder were added to and mixed with NiO powder and YSZ powder in a ball mill for 24 hours, to thereby prepare a slurry. The slurry was applied to the top surface of the molded product for the collector portion, followed by drying, to thereby form the molded product (membrane) for the active portion. Formation of the molded product for the active portion on the top surface of the molded product for the collector portion may be carried out through tape lamination, printing, or a similar technique.

As described in detail hereinbelow, particularly, the sizes of Ni grains, YSZ grains, and pores present in the active portion of the fuel electrode, as well as "isolated Ni grain ratio (described below)" can be adjusted by controlling, for example, powder properties (particle size and specific surface area), the amount of a pore-forming material incorporated, slurry properties (solid/liquid ratio, and the composition of an organic material such as a binder), and conditions of the aforementioned reduction treatment.

Next, a molded product for the electrolyte membrane 120 was formed and stacked on the top surface of the molded product for the fuel electrode 110 as follows. Specifically, water and a binder were added to and mixed with YSZ powder in a ball mill for 24 hours, to thereby prepare a slurry. The slurry was applied to the top surface of the molded product for the fuel electrode 110, followed by drying, to thereby form the molded product (membrane) for the electrolyte membrane 120. Formation of the molded product for the electrolyte membrane 120 on the top surface of the molded product for the fuel electrode 110 may be carried out through tape lamination, printing, or a similar technique.

Subsequently, a molded product for the reaction preventing membrane 130 was formed on the top surface of the molded product for the electrolyte membrane 120 as follows. Specifically, water and a binder were added to and mixed with GDC powder in a ball mill for 24 hours, to thereby prepare a slurry.

The slurry was applied to the top surface of the molded product for the electrolyte membrane 120, followed by drying, to thereby form the molded product (membrane) for the reaction preventing membrane 130. Formation of the molded product for the reaction preventing membrane 130 on the top surface of the molded product for the electrolyte membrane 120 may be carried out through tape lamination, printing, or a similar technique.

Thus, there was formed a layered product (non-fired product) including the molded product for the fuel electrode 110, the molded product for the electrolyte membrane 120, and the molded product for the reaction preventing membrane 130. The layered product (non-fired product) was subjected to co-sintering at 1,300 to 1,600° C. for 2 to 20 hours, to thereby form a layered product (fired product) including the porous fuel electrode 110, the dense electrolyte membrane 120, and the dense reaction preventing membrane 130.

Next, the air electrode 140 was formed on the top surface of the reaction preventing membrane 130 of the layered product as follows. Specifically, water and a binder were added to and mixed with LSCF powder in a ball mill for 24 hours, to thereby prepare a slurry. The slurry was applied to the top surface of the reaction preventing membrane 130, followed by drying, and firing by means of an electric furnace in air (i.e., an oxygen-containing atmosphere) at 1,000° C. for one hour, to thereby form the porous air electrode 140 on the top surface of the reaction preventing membrane 130.

Thereafter, the fuel electrode 110 is subjected to the aforementioned reduction treatment. Thus, the fuel electrode 110 is imparted with electrical conductivity, and the SOFC can be operated. Specific conditions of the reduction treatment are as follow.

Temperature elevation rate: 50° C./hr to 400° C./hr
Reducing gas: hydrogen concentration of 4% or more
Reduction gas feed temperature: 400° C. or higher (preferably 600° C. or higher)
Reduction temperature: 700 to 900° C.
Reduction time: 1 to 50 hours Thus, description has been made regarding the method for producing the SOFC cell shown in FIG. 1.

(Appropriate Combination of the Sizes of Ni Grains, YSZ Grains, and Pores in a Near-Interface Region)

As described in the section "Summary of the Invention," when a cross section of an SOFC cell sample in a thickness direction (layer-stacking direction) is observed through the aforementioned "new SEM observation technique" described in "Solid State Ionics 178 (2008) 1984," Ni gains, YSZ grains, and pores present in the fuel electrode can be distinguished from one another.

Also, as described in the section "Summary of the Invention," Ni grains present in the fuel electrode include the aforementioned "isolated Ni grains" (non-percolating Ni grains) and the aforementioned "continuous Ni grains" (percolating Ni grains). "Isolated Ni grains" and "continuous Ni grains" present in the fuel electrode can be distinguished from each other through the aforementioned "new SEM observation technique."

Figure 2:
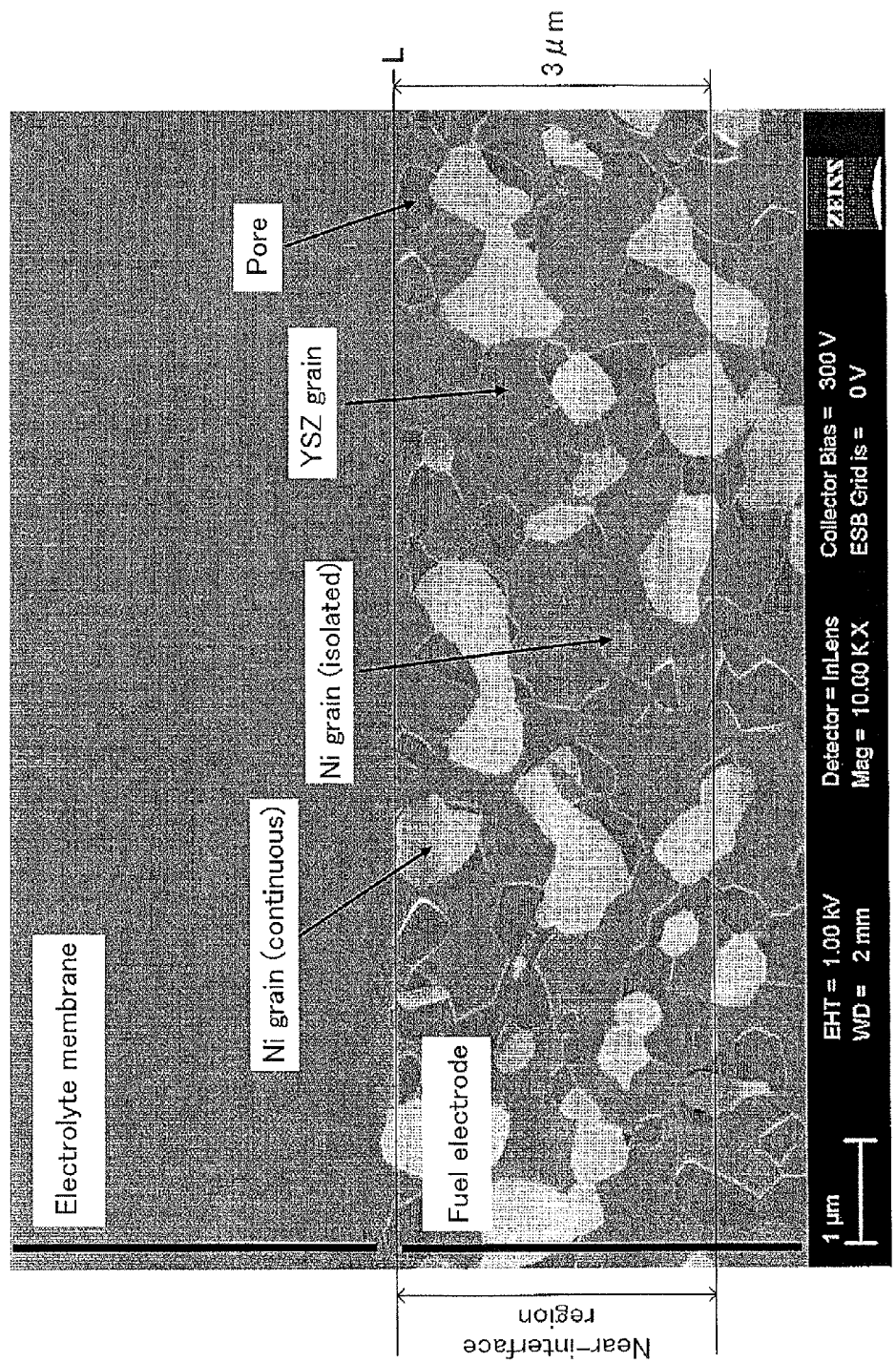
FIG. 2 is an SEM image of an exemplary cross section of the SOFC (in particular, a fuel electrode and an electrolyte membrane) according to the embodiment of the present invention.

FIG. 2 shows an SEM image of a cross section of the SOFC cell sample (shown in FIG. 1) in a thickness direction (layer-stacking direction) (in particular, a cross section of the active portion of the fuel electrode 110 and the electrolyte membrane 120), the SEM image being obtained through the aforementioned "new SEM observation technique." FIG. 2 is an SEM image of a cross section including the electrolyte membrane and the active layer of the fuel electrode, as observed under a field emission scanning electron microscope (FE-SEM) employing an in-lens secondary electron detector (magnification: ×10,000). This cross section has been subjected to precise mechanical polishing and then to ion milling treatment by means of IM4000 (product of Hitachi High-Technologies Corporation). FIG. 2 is an SEM image obtained by means of an FE-SEM (model: ULTRA55, product of Zeiss (Germany)) (acceleration voltage: 1 kV, working distance: 2 mm).

In FIG. 2, light-dark contrast is represented by gray scale. As is clear from FIG. 2, according to the aforementioned "new SEM observation technique," "continuous Ni grains," "isolated Ni grains," "YSZ grains," and "pores" present in the fuel electrode can be distinguished from one another by utilizing the corresponding light-dark contrast.

Specifically, the aforementioned SEM image can be classified, through image analysis or a similar technique, into four types of regions according to brightness. The brightest regions correspond to "continuous Ni grains"; the second brightest regions correspond to "isolated Ni grains"; the third brightest regions correspond to "YSZ grains"; and the darkest regions correspond to "pores." This image analysis may be carried out by means of, for example, image analysis software HALCON (product of MVTec (Germany)).

The technique for distinguishing Ni grains, YSZ grains, and pores from one another through image analysis is not limited to one utilizing light-dark contrast in an SEM image. For example, the respective grains in an SEM image may be identified by obtaining element mapping data in a single visual field through SEM-EDS, and then comparing the thus-obtained data with FE-SEM images (including in-lens images and out-lens images) which have been obtained in advance by means of an in-lens secondary electron detector. Ni grains, YSZ grains, and pores can be distinguished from one another on the basis of three different types of regions. In this case, the respective grains may be readily identified as follows. Specifically, firstly, low-brightness regions on an out-lens image can be determined as corresponding to pores. Thereafter, high-brightness regions on an in-lens image (other than regions corresponding to pores) can be determined as corresponding to Ni grains, and low-brightness regions on the image can be determined as corresponding to YSZ grains.

In addition to the aforementioned image analysis, there may be employed composition analysis in which energy dispersive X-ray spectrometry (so-called EDS analysis) is carried out on a cross section corresponding to the aforementioned SEM image. Through this technique, Ni grains can be distinguished from YSZ grains, and thus Ni grains can be identified. Among the thus-identified Ni grains, bright grains can be determined as corresponding to continuous Ni grains, whereas dark grains can be determined as corresponding to isolated Ni grains.

Also, continuous Ni grains may be distinguished from isolated Ni grains through a continuity test employing an atomic force microscope (AFM). Specifically, an electrically conductive member is provided on an SOFC cell sample in which a cross section corresponding to the aforementioned SEM image is exposed, so that the member is electrically connected to a portion (differing from the cross section) of the fuel electrode. While a specific voltage is applied between the electrically conductive member and the cantilever (probe) of the AFM, the cantilever is scanned over the cross section. On the basis of the relationship between a position on the cross section and the level of current corresponding to the position, regions in the cross section which have been determined as corresponding to Ni grains can be classified into two types of regions: "conductive regions" and "non-conductive regions." "Conductive regions" can be determined as corresponding to continuous Ni grains, whereas "non-conductive regions" can be determined as corresponding to isolated Ni grains.

In the aforementioned techniques, distinction between continuous Ni grains and isolated Ni grains is carried out by use of a cross section of an SOFC sample obtained by actually cutting the sample in a thickness direction (layer-stacking direction) through machining. Therefore, conceivably, Ni grains distributed in the vicinity of the cross section may contain isolated Ni grains which have been transformed from continuous Ni grains through cutting (or vice versa).

However, conceivably, Ni grains distributed in the vicinity of the cross section contain a very small amount of isolated Ni grains which have been transformed from continuous Ni grains through cutting (or vice versa). Therefore, regarding "isolated Ni grain ratio" discussed hereinbelow, the "isolated Ni grain ratio" calculated on the basis of a cross section of an SOFC sample obtained by actually cutting the sample through machining is considered to be almost equal to the true "isolated Ni grain ratio" of an uncut SOFC sample.

The present inventors observed, through this "new SEM observation technique," cross sections of various fuel electrodes 110 which had been subjected to reduction treatment. Particularly, the present inventors focused on a "region of the fuel electrode 110 located within 3 µm from the interface between the fuel electrode 110 and the electrolyte membrane 120" (see FIG. 2, hereinafter the region may be referred to as a "near-interface region"), which region is considered to greatly affect the "reaction at the fuel electrode" (i.e., reaction represented by formula (2) described in the section "Background Art").

This will be further described below. In the present embodiment, the fuel electrode 110 and the electrolyte membrane 120 are formed (sintered) through co-firing. Therefore, during the course of co-firing, a region of the fuel electrode (membrane) 110 in the vicinity of the interface between the fuel electrode 110 and the electrolyte membrane 120 (i.e., the aforementioned "near-interface region") is easily affected by the electrolyte membrane 120. Specifically, the near-interface region is affected by the difference in firing initiation temperature or firing shrinkage between the fuel electrode 110 and the electrolyte membrane 120, or mutual diffusion of constitutive elements between the fuel electrode 110 and the electrolyte membrane 120. This may result in a very high probability that the aforementioned "near-interface region" of the fuel electrode 110 has a microstructure (i.e., grain size (pore size) distribution) different from that of a region (other than the near-interface region) of the fuel electrode 110 (i.e., a region distal to the interface between the electrode and the electrolyte membrane 120). Therefore, the present inventors focused on only "the microstructure of the near-interface region," which greatly affects the reaction at the fuel electrode 110, but did not focus on "the microstructure of a region which is distal to the interface and which less affects the reaction at the fuel electrode," which microstructure is highly likely to be different from "the microstructure of the near-interface region."

When the fuel electrode has a two-layer structure including the aforementioned "collector portion" and "active portion," "the near-interface region" corresponds to a portion of the active portion. Next will be described the case where the fuel electrode has a two-layer structure including the aforementioned "collector portion" and "active portion" (i.e., the case where "the near-interface region" corresponds to a portion of the active portion).

For example, the "interface between the active portion of the fuel electrode and the electrolyte membrane 120" is defined as follows. Specifically, firstly, an SEM image as shown in FIG. 2 (including the interface between the active portion of the fuel electrode and the electrolyte membrane) is obtained through the aforementioned "new SEM observation technique." In this SEM image (visual field), among the "continuous Ni grains," "isolated Ni grains," "YSZ grains," and "pores" forming the active portion of the fuel electrode (hereinafter, these grains and pores may be collectively referred to as "constituents"), a plurality of constituents which face the electrolyte membrane are specified. In each of the thus-specified constituents, there is specified a point of the region corresponding to the constituent, the point being located closest (uppermost in FIG. 2) to the electrolyte membrane. A straight line passing in the vicinity of the thus-specified points is determined through a well-known statistical technique (e.g., least squares method). This line (line L shown in FIG. 2) corresponds to "the interface between the active portion of the fuel electrode and the electrolyte membrane 120."

Through the aforementioned observation of cross sections of various fuel electrodes, the present inventors have found that a combination of the sizes of Ni grains, YSZ grains, and pores contained in "the near-interface region" of the reduction-treated fuel electrode greatly affects the reaction resistance of the active portion of the fuel electrode. In addition, the present inventors have found that an appropriate combination of the mean sizes of Ni grains, YSZ grains, and pores contained in "the near-interface region" of the reduction-treated fuel electrode is required for reducing the reaction resistance of the active portion of the fuel electrode. Next will be described a test whose results led to these findings.

As used herein, the "size of an Ni grain" may be defined as the diameter of a circle having the same area as a region corresponding to the Ni grain (isolated Ni grain or continuous Ni grain) in an SEM image as shown in FIG. 2 (including the interface between the active portion of the fuel electrode and the electrolyte membrane), the image being obtained through the aforementioned "new SEM observation technique" (the same shall apply to the size of a YSZ grain and the size of a pore). Such a technique for inferring a three-dimensional structure (grain size or pore size) from the corresponding two-dimensional structure (cross-sectional image) is described in detail in Nobuyasu Mizutani, Yoshiharu Ozaki, Toshio Kimura, and Takashi Yamaguchi "Ceramic Processing," Gihodo Shuppan Co., Ltd., issued on Mar. 25, 1985, pp. 190 to 201.

Mean grain size (pore size) must be calculated from data obtained through observation and analysis of cross sections (SEM images) of a plurality of different sites (visual fields). This is based on the requirement that grains (pores) having an appropriate size must be distributed over a wide "near-interface region" for reducing the reaction resistance of the active portion of the fuel electrode. Specifically, mean grain (pore) size is preferably calculated from, for example, data obtained through analysis of cross sections of 20 or more different sites (visual fields) as observed at a magnification of 5,000 to 20,000.

<Test>

In this test, there were prepared various samples corresponding to the SOFC according to the aforementioned embodiment; i.e., samples on the basis of different combinations of the sizes of "Ni grains," "YSZ grains," and "pores" contained in the active portion of the reduction-treated fuel electrode. Ni grain size was adjusted by, for example, controlling properties (particle size and specific surface area) of NiO powder incorporated into a slurry for forming the active portion of the fuel electrode. Similar to the case of NiO grain size, YSZ grain size was adjusted by, for example, controlling properties (particle size and specific surface area) of YSZ powder incorporated into the slurry for forming the active portion of the fuel electrode. Pore size was adjusted by, for example, controlling the particle size and amount of a pore-forming material incorporated into the slurry for forming the active portion of the fuel electrode. Adjustment of NiO grain size, YSZ grain size, and pore size may be carried out by controlling the firing time and the firing temperature.

In each of the samples, the thickness of the collector portion of the fuel electrode (Ni-YSZ) was adjusted to 1,000 µm; the thickness of the active portion of the fuel electrode was adjusted to 20 µm; the thickness of the electrolyte membrane 120 (YSZ) was adjusted to 5 µm; the thickness of the reaction preventing membrane 130 (GDC) was adjusted to 20 µm; and the thickness of the air electrode 140 (LSCF) was adjusted to 50 µm. Each sample was prepared to have a circular form (diameter: 30 mm) as viewed from above.

Each sample was heated to 800° C. while nitrogen gas was supplied to the fuel electrode 110 and air was supplied to the air electrode 140. After the temperature of the sample had reached 800° C., the sample was subjected to reduction treatment for three hours under supply of hydrogen gas to the fuel electrode 110. After this reduction treatment, the power density of the sample (SOFC) was measured (temperature: 800° C., rated voltage: 0.8 V).

In general, the electrical resistance of an SOFC is represented by resistance as defined by "(voltage)/(current)" (so-called IR resistance) or resistance based on chemical reaction rate (reaction resistance). The IR resistances of the above-prepared samples were measured, and the difference in IR resistance between the samples was found to be small. Therefore, conceivably, the power density of an SOFC greatly depends on the reaction resistance thereof. That is, the greater the power density, the lower the reaction resistance of the active portion of the fuel electrode.

Figure 3:
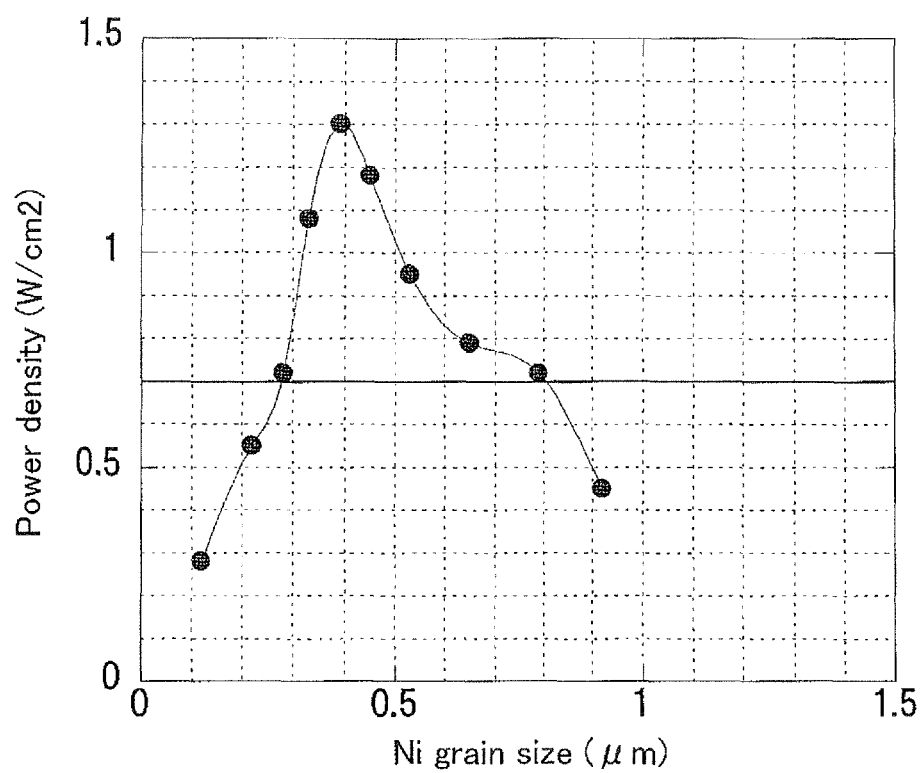
FIG. 3 is a graph showing an exemplary relationship between the mean size of Ni grains "present in a near-interface region" and the output of an SOFC cell.

FIG. 3 shows the relationship between "mean Ni grain size" and "power density of SOFC" as determined on the basis of Ni grains of different sizes present in the "near-interface region" of the reduction-treated fuel electrode. In each sample, "mean Ni grain size" refers to the mean value of the sizes of Ni grains (isolated Ni grains+continuous Ni grains) present in the "near-interface region" of the reduction-treated fuel electrode. For determining the relationship shown in FIG. 3, the size of YSZ grains present in the "near-interface region" of the reduction-treated fuel electrode is maintained at 0.4 to 0.6 µm, and the size of pores present in the "near-interface region" of the reduction-treated fuel electrode is maintained at 0.3 to 0.5 µm.

Figure 4:
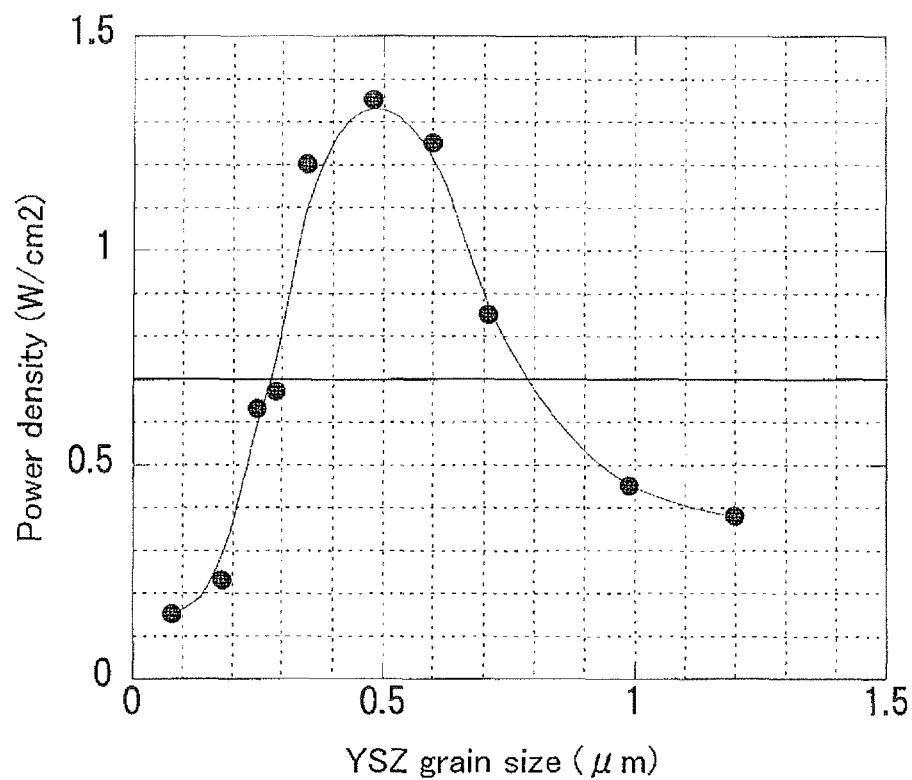
FIG. 4 is a graph showing an exemplary relationship between the mean size of YSZ grains "present in a near-interface region" and the output of an SOFC cell.

FIG. 4 shows the relationship between "mean YSZ grain size" and "power density of SOFC" as determined on the basis of YSZ grains of different sizes present in the "near-interface region" of the reduction-treated fuel electrode. In each sample, "mean YSZ grain size" refers to the mean value of the sizes of YSZ grains present in the "near-interface region" of the reduction-treated fuel electrode. For determining the relationship shown in FIG. 4, the size of Ni grains (isolated Ni grains+continuous Ni grains) present in the "near-interface region" of the reduction-treated fuel electrode is maintained at 0.4 to 0.6 µm, and the size of pores present in the "near-interface region" of the reduction-treated fuel electrode is maintained at 0.3 to 0.5 µm.

Figure 5:
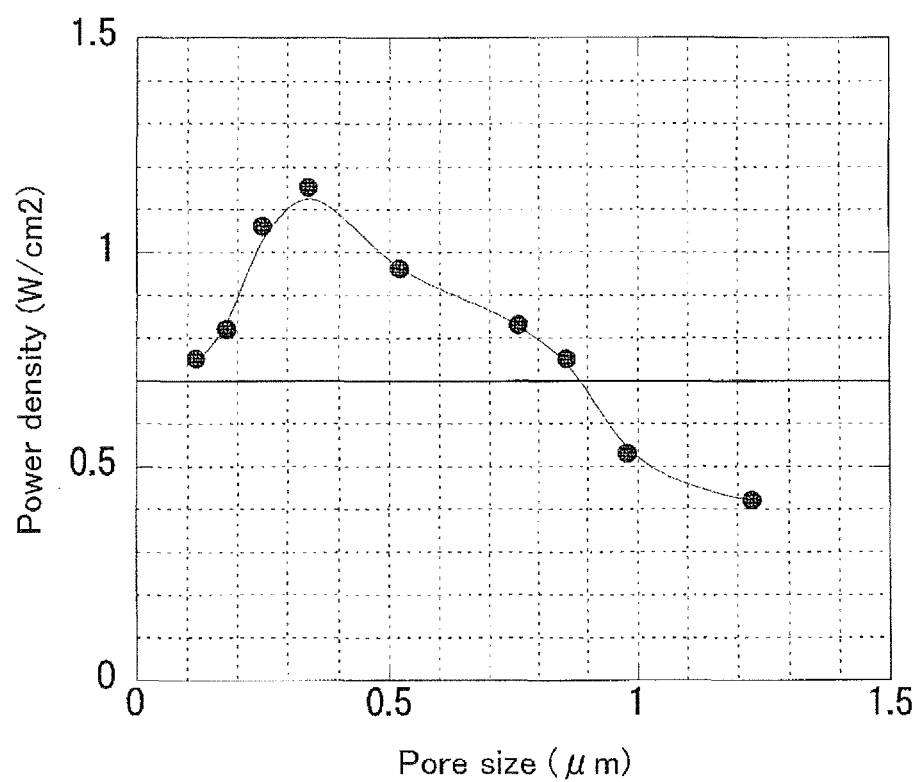
FIG. 5 is a graph showing an exemplary relationship between the mean size of pores "present in a near-interface region" and the output of an SOFC cell.

FIG. 5 shows the relationship between "mean pore size" and "power density of SOFC" as determined on the basis of pores of different sizes present in the "near-interface region" of the reduction-treated fuel electrode. In each sample, "mean pore size" refers to the mean value of the sizes of pores present in the "near-interface region" of the reduction-treated fuel electrode. For determining the relationship shown in FIG. 5, the size of Ni grains (isolated Ni grains+continuous Ni grains) present in the "near-interface region" of the reduction-treated fuel electrode is maintained at 0.4 to 0.6 μm, and the size of YSZ grains present in the "near-interface region" of the reduction-treated fuel electrode is maintained at 0.4 to 0.6 μm.

In this test, a sample exhibiting a power density of 0.7 W/cm$^2$ or more is regarded as being in a high output state. As is clear from FIGS. 3, 4, and 5, when the mean size of Ni grains present in the "near-interface region" of the reduction-treated fuel electrode is 0.28 to 0.80 μm; the mean size of YSZ grains present in the region is 0.28 to 0.80 μm; and the mean size of pores present in the region is 0.10 to 0.87 μm, a high output state is achieved. That is, when the mean sizes of Ni grains, YSZ grains, and pores present in the "near-interface region" of the reduction-treated fuel electrode fall within the aforementioned respective ranges, the active portion of the fuel electrode exhibits low reaction resistance. Thus, description has been made regarding an appropriate combination of the sizes of Ni grains, YSZ grains, and pores present in the "near-interface region" of the reduction-treated fuel electrode required for reducing the reaction resistance of the active portion of the fuel electrode.

When the mean sizes of Ni grains, YSZ grains, and pores present in the "near-interface region" of the reduction-treated fuel electrode fell within the aforementioned respective ranges, the standard deviations of Ni grain size, YSZ grain size, and pore size were found to be 0.10 to 0.60, 0.15 to 0.60, and 0.05 to 0.70, respectively.

(Appropriate Combination of the Sizes of Ni Grains, YSZ Grains, and Pores Facing the Electrolyte Membrane)

Also, the present inventors further investigated a combination of the sizes of "Ni grains, YSZ grains, and pores facing the electrolyte membrane," which are considered to most greatly affect "the reaction at the active portion of the fuel electrode," among "Ni grains, YSZ grains, and pores present in the near-interface region."

Figure 6:
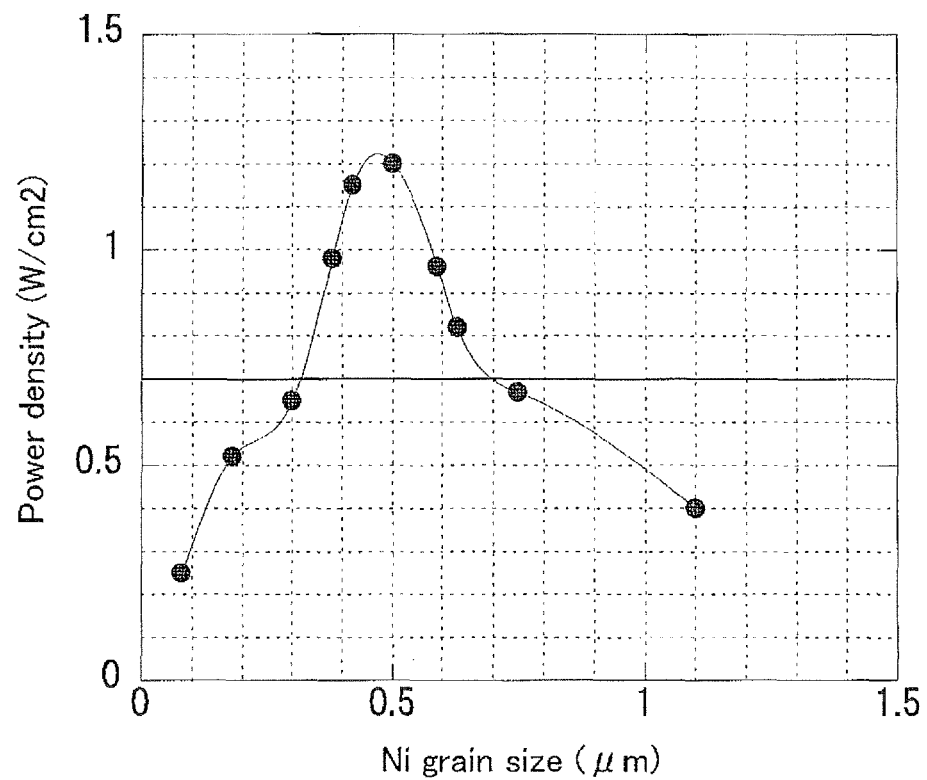
FIG. 6 is a graph showing an exemplary relationship between the mean size of Ni grains "present in a near-interface region and facing an electrolyte membrane" and the output of an SOFC cell.

FIG. 6 shows the relationship between "mean Ni grain size" and "power density of SOFC" as determined on the basis of "Ni grains of different sizes facing the electrolyte membrane 120," the Ni grains being present in the reduction-treated fuel electrode. In each sample, "mean Ni grain size" refers to the mean value of the sizes of "Ni grains (isolated Ni grains+continuous Ni grains) facing the electrolyte membrane 120," the Ni grains being present in the reduction-treated fuel electrode. For determining the relationship shown in FIG. 6, the size of "YSZ grains facing the electrolyte membrane 120," the YSZ grains being present in the reduction-treated fuel electrode, is maintained at 0.4 to 0.6 μm, and the size of "pores facing the electrolyte membrane 120," the pores being present in the reduction-treated fuel electrode, is maintained at 0.3 to 0.5 μm.

Figure 7:
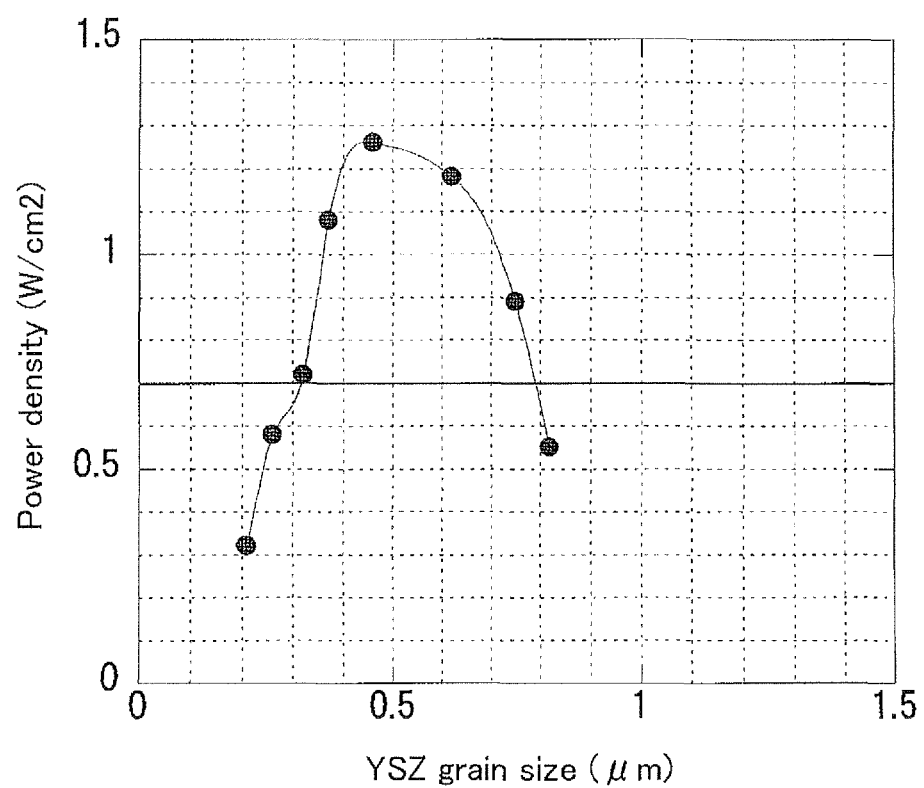
FIG. 7 is a graph showing an exemplary relationship between the mean size of YSZ grains "present in a near-interface region and facing an electrolyte membrane" and the output of an SOFC cell.

FIG. 7 shows the relationship between "mean YSZ grain size" and "power density of SOFC" as determined on the basis of "YSZ grains of different sizes facing the electrolyte membrane 120," the YSZ grains being present in the reduction-treated fuel electrode. In each sample, "mean YSZ grain size" refers to the mean value of the sizes of "YSZ grains facing the electrolyte membrane 120," the YSZ grains being present in the reduction-treated fuel electrode. For determining the relationship shown in FIG. 7, the size of "Ni grains (isolated Ni grains+continuous Ni grains) facing the electrolyte membrane 120," the Ni grains being present in the reduction-treated fuel electrode, is maintained at 0.4 to 0.6 μm, and the size of "pores facing the electrolyte membrane 120," the pores being present in the reduction-treated fuel electrode, is maintained at 0.3 to 0.5 μm.

Figure 8:
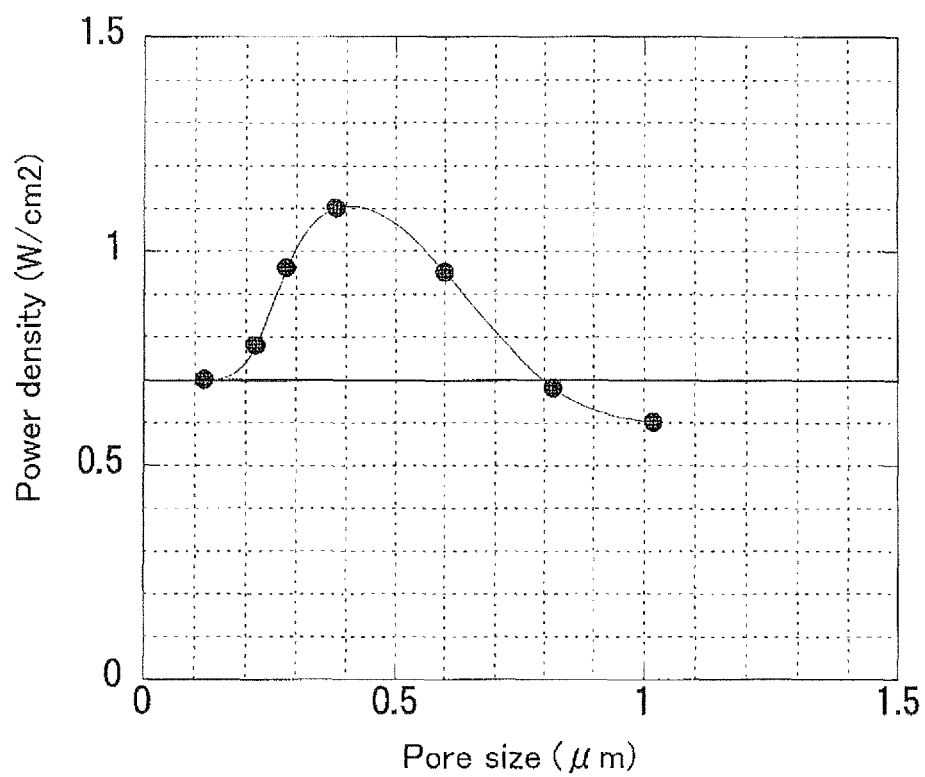
FIG. 8 is a graph showing an exemplary relationship between the mean size of pores "present in a near-interface region and facing an electrolyte membrane" and the output of an SOFC cell.

FIG. 8 shows the relationship between "mean pore size" and "power density of SOFC" as determined on the basis of "pores of different sizes facing the electrolyte membrane 120," the pores being present in the reduction-treated fuel electrode. In each sample, "mean pore size" refers to the mean value of the sizes of "pores facing the electrolyte membrane 120," the pores being present in the reduction-treated fuel electrode. For determining the relationship shown in FIG. 8, the size of "Ni grains (isolated Ni grains+continuous Ni grains) facing the electrolyte membrane 120," the Ni grains being present in the reduction-treated fuel electrode, is maintained at 0.4 to 0.6 μm, and the size of "YSZ grains facing the electrolyte membrane 120," the YSZ grains being present in the reduction-treated fuel electrode, is maintained at 0.4 to 0.6 μm.

As is clear from FIGS. 6, 7, and 8, in the "constituents" facing the electrolyte membrane and present in the reduction-treated fuel electrode, when the mean size of Ni grains is 0.31 to 0.70 μm; the mean size of YSZ grains is 0.32 to 0.78 μm, and the mean size of pores is 0.15 to 0.80 μm, a high output state is achieved. That is, when the mean sizes of Ni grains, YSZ grains, and pores present in the reduction-treated fuel electrode and facing the electrolyte membrane fall within the aforementioned respective ranges, the active portion of the fuel electrode exhibits lower reaction resistance.

Regarding the "constituents" facing the electrolyte membrane and present in the reduction-treated fuel electrode, when the mean sizes of Ni grains, YSZ grains, and pores fell within the aforementioned respective ranges, the standard deviations of Ni grain size, YSZ grain size, and pore size were found to be 0.14 to 0.55, 0.13 to 0.60, and 0.10 to 0.65, respectively.

In the present embodiment, data on grains (or pores) having a size of 0.1 μm or less recognized by the aforementioned image analysis software are not employed for calculating the mean value or standard deviation of the aforementioned grain sizes (Ni grain sizes or YSZ grain sizes) or pore sizes. This is based on the idea that grains (or pores) having a size of 0.1 μm or less recognized by the aforementioned image analysis software whose existence is not clearly confirmed through observation at higher magnification are not appropriate to take into account as a factor for determining output performance.

(Appropriate Isolated Ni Grain Ratio)

As used herein, the term "isolated Ni grain ratio" refers to the ratio of "the total volume of isolated Ni grains present in a near-interface region" to "the total volume of all the Ni grains (i.e., isolated Ni grains+continuous Ni grains) present in the near-interface region."

The present inventors considered that isolated Ni grain ratio may affect reduction in reaction resistance of the active portion of the fuel electrode, and further investigated "isolated Ni grain ratio." For example, "isolated Ni grain ratio" is determined as follows. Specifically, firstly, an SEM image as shown in FIG. 2 (including the interface between the active portion of the fuel electrode and the electrolyte membrane) is obtained through the aforementioned "new SEM observation technique." In this SEM image (visual field), "the interface between the active portion of the fuel electrode and the electrolyte membrane 120" is determined through the aforementioned technique. Therefore, in this SEM image, the "near-interface region" is determined. Subsequently, in this SEM image, "isolated Ni grains" and "continuous Ni grains" present in the "near-interface region" are specified. Next, in this SEM image, the total area of regions corresponding to the "isolated Ni grains" (total area 1) and the total area of regions corresponding to the "continuous Ni grains" (total area 2) are determined. Then, "isolated Ni grain ratio" is determined by dividing "total area 1" by "the sum of total area 1 and total area 2."

Adjustment of "isolated Ni grain ratio" (i.e., adjustment of a state of binding between adjacent Ni grains) was carried out by, for example, controlling properties (particle size and specific surface area) of NiO powder incorporated into a slurry for forming the active portion of the fuel electrode. Alternatively, "isolated Ni grain ratio" may be adjusted by controlling the firing time and the firing temperature, or controlling the particle size and amount of a pore-forming material incorporated. Alternatively, "isolated Ni grain ratio" may be adjusted by any combination of the aforementioned various adjustment factors.

Figure 9:
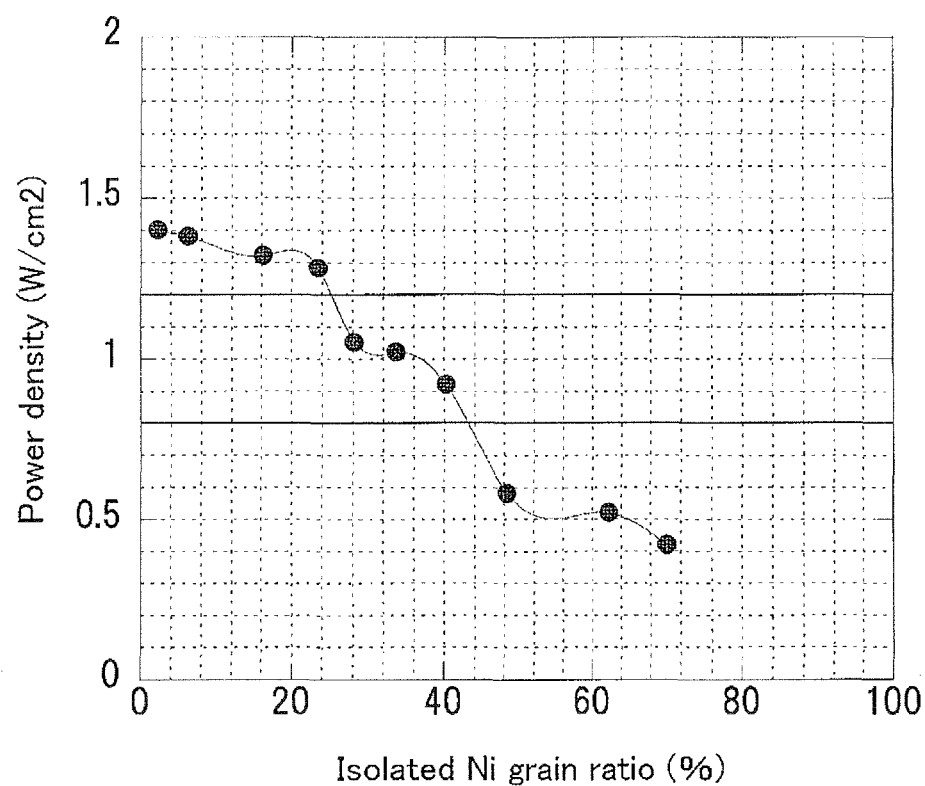
FIG. 9 is a graph showing an exemplary relationship between the "isolated Ni grain ratio in a near-interface region" and the output of an SOFC cell.

FIG. 9 shows the relationship between "isolated Ni grain ratio" and "power density of SOFC" as determined on the basis of different "isolated Ni grain ratios" in the reduction-treated fuel electrode. In the relationship shown in FIG. 9, the size of Ni grains (isolated Ni grains+continuous Ni grains) present in the "near-interface region" of the reduction-treated fuel electrode is maintained at 0.4 to 0.6 μm; the size of YSZ grains present in the "near-interface region" of the reduction-treated fuel electrode is maintained at 0.4 to 0.6 μm; and the size of pores present in the "near-interface region" of the reduction-treated fuel electrode is maintained at 0.3 to 0.5 μm. Isolated Ni grain ratio failed to be adjusted to less than 2%.

In this test, a sample exhibiting a power density of 0.8 W/cm² or more is regarded as being in a high output state. As is clear from FIG. 9, when "isolated Ni grain ratio" is as small as 2 to 40%, higher power density is attained. That is, when "isolated Ni grain ratio" falls within the above range, a high output state is achieved; i.e., the active portion of the fuel electrode exhibits lower reaction resistance. Conceivably, this result is based on the fact that when isolated Ni grain ratio is low (i.e., when continuous Ni grains are densely present), there are densely formed passages for conducting electrons generated through the reaction at the active portion of the fuel electrode.

In the case where a sample exhibiting a power density of 1.2 W/cm² or more is regarded as being in a high output state, as is clear from FIG. 9, when "isolated Ni grain ratio" is as small as 2 to 25%, much higher power density is attained.

Furthermore, the present inventors considered that isolated Ni grain ratio may also correlate with "percent reduction in power density" at a rated current density (0.3 A/cm²) of SOFC, and investigated the relationship between isolated Ni grain ratio and "percent reduction in power density" of SOFC. As used herein, "percent reduction in power density" is defined by the following formula: (A−B)/A (%) (wherein A represents the power density of an SOFC before being subjected to a "durability test which is continuously carried out for 1,000 hours," and B represents the power density of the SOFC after having been subjected to the durability test). Low "percent reduction in power density" of an SOFC indicates that when the SOFC is subjected to the aforementioned durability test, the "percent increase in reaction resistance of the active portion of the fuel electrode" of the SOFC is low; i.e., even when the SOFC is operated for a long period of time, the reaction resistance of the active portion of the fuel electrode is less likely to increase.

Figure 10:
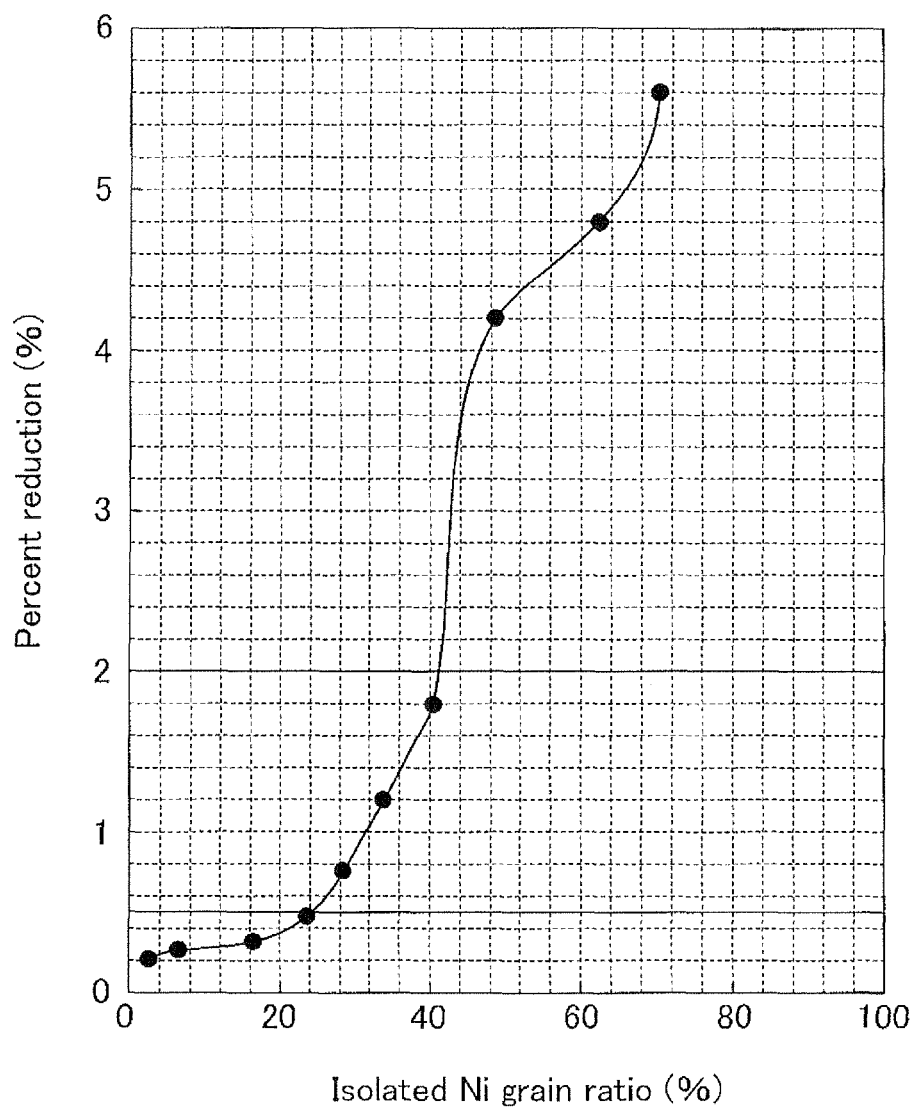
FIG. 10 is a graph showing an exemplary relationship between the "isolated Ni grain ratio in a near-interface region" and the "percent reduction in power density" of an SOFC.

FIG. 10 shows the relationship between "isolated Ni grain ratio" and "percent reduction in power density" of SOFC as determined on the basis of different "isolated Ni grain ratios" in the reduction-treated fuel electrode. Similar to the case shown in FIG. 9, in the relationship shown in FIG. 10, the size of Ni grains (isolated Ni grains+continuous Ni grains) present in the "near-interface region" of the reduction-treated fuel electrode is maintained at 0.4 to 0.6 μm; the size of YSZ grains present in the "near-interface region" of the reduction-treated fuel electrode is maintained at 0.4 to 0.6 μm; and the size of pores present in the "near-interface region" of the reduction-treated fuel electrode is maintained at 0.3 to 0.5 μm. Also in this test, isolated Ni grain ratio failed to be adjusted to less than 2%.

As is clear from FIG. 10, when "isolated Ni grain ratio" is as small as 2 to 40%, "percent reduction in power density" is extremely lowered (boundary: percent reduction=2%), as compared with the case where "isolated Ni grain ratio" exceeds 40%. That is, when "isolated Ni grain ratio" falls within the above range, an increase in reaction resistance of the active portion of the fuel electrode is extremely suppressed even after long-term operation. Furthermore, when "isolated Ni grain ratio" is as small as 2 to 25%, "percent reduction in power density" is more extremely lowered (boundary: percent reduction=0.5%), as compared with the case where "isolated Ni grain ratio" exceeds 25%. Conceivably, this result is based on the fact that when isolated Ni grain ratio is low (i.e., when continuous Ni grains are densely present), there is reduced the number of "electron conduction passages" which are broken through long-term operation.

The data obtained from the test employing the aforementioned "new SEM observation technique" indicated that when an SOFC is configured so that the mean size of Ni grains present in the "near-interface region" of the reduction-treated fuel electrode is 0.28 to 0.80 μm; the mean size of YSZ grains present in the "near-interface region" is 0.28 to 0.80 μm; and the mean size of pores present in the "near-interface region" is 0.10 to 0.87 μm, the active portion of the fuel electrode of the SOFC exhibits low reaction resistance.

The data also indicated that when an SOFC is configured so that the mean size of Ni grains present in the reduction-treated fuel electrode and facing the electrolyte membrane is 0.31 to 0.70 μm; the mean size of YSZ grains present in the reduction-treated fuel electrode and facing the electrolyte membrane is 0.32 to 0.78 μm; and the mean size of pores present in the reduction-treated fuel electrode and facing the electrolyte membrane is 0.15 to 0.80 μm, the active portion of the fuel electrode of the SOFC exhibits lower reaction resistance.

The data also indicated that when an SOFC is configured so that the "isolated Ni grain ratio" in the reduction-treated fuel electrode is 2 to 40%, the active portion of the fuel electrode of the SOFC exhibits much lower reaction resistance, and an increase in reaction resistance of the active portion of the fuel electrode of the SOFC is extremely suppressed even after Long-term operation.

Next will be described techniques for realizing the microstructure of the active portion of the fuel electrode according to the present embodiment.

1. The mean particle size of powdery raw materials (NiO and 8YSZ) was adjusted to 0.3 μm to 1.3 μm. Fine particles having a size of 0.1 μm or less and coarse particles having a size of 20 μm or more were removed through classification treatment. This classification treatment may be carried out by means of, for example, an airflow-type classifier.

2. The mean particle size of a pore-forming material was adjusted to 0.8 μm to 10 μm. Fine particles having a size of 0.2 μm or less and coarse particles having a size of 30 μm or more were removed through classification treatment. The pore-forming material employed may be, for example, cellulose or PMMA (polymethyl methacrylate resin).

3. The amount of the pore-forming material added was adjusted to 30 vol % or less with respect to the ceramic raw materials (NiO+YSZ).

4. The temperature for co-firing of the active portion of the fuel electrode and the electrolyte membrane (including the reaction preventing membrane) was adjusted to 1,350° C. to 1,500° C., and the co-firing time was adjusted to one hour to 20 hours.

5. The materials forming the active layer of the fuel electrode (printing paste when formed through printing) were uniformly mixed.

6. When a printing paste was prepared as a material for forming the active layer of the fuel electrode, an appropriate dispersant (e.g., wetting dispersant "DISPERBYKR-180," product of BYK Japan KK) was added to the slurry so as to attain good dispersibility, and then the slurry was uniformly mixed through sufficient mixing by means of a pot mill and a triroll mill.

In order to realize the microstructure of the fuel electrode (the active portion thereof) according to the present embodiment, during the courses of firing and reduction, a porous structure must be stabilized by controlling incorporation of an additive into the fuel electrode (the active portion thereof) which contains, as main components, a material exhibiting electron conductivity (e.g., Ni) and a material exhibiting oxygen ion conductivity (e.g., YSZ). Specifically, as has been known, it is important that the amount of an additive incorporated into the fuel electrode (the active portion thereof) is controlled as described below. Such an additive may be incorporated into raw materials in advance, or may be incorporated during production of an SOFC.

Si: 200 ppm or less, preferably 100 ppm or less
P: 50 ppm or less, preferably 30 ppm or less
Cr: 100 ppm or less, preferably 50 ppm or less
B: 100 ppm or less, preferably 50 ppm or less
S: 100 ppm or less, preferably 30 ppm or less When such an element is added in a small amount, sinterability is improved, and the skeleton of the porous fuel electrode may be reinforced. However, addition of such an element in an excessive amount is not preferred, since the excessive addition may cause reduction in the aforementioned power density. Conceivably, the reason for this is based on the fact that sintering of Ni proceeds in the active portion of the fuel electrode during long-term operation, whereby the reaction field is reduced (reaction resistance increases). Next will be described a test whose results led to these findings.

This test was carried out for investigating the relationship between the amount of an additive incorporated in the aforementioned fuel electrode (the active portion thereof) and the aforementioned "percent reduction in power density." Table 1 shows the investigation results. In this test, the size of Ni grains (isolated Ni grains+continuous Ni grains) present in the "near-interface region" of the reduction-treated fuel electrode is maintained at 0.4 to 0.6 µm; the size of YSZ grains present in the "near-interface region" of the reduction-treated fuel electrode is maintained at 0.4 to 0.6 µm; and the size of pores present in the "near-interface region" of the reduction-treated fuel electrode is maintained at 0.3 to 0.5 µm.

TABLE 1

| Combination | Additive (ppm) | | | | | Percent reduction (%) | Evaluation |
| --- | --- | --- | --- | --- | --- | --- | --- |
| | Si | P | Cr | B | S | | |
| 1 | 250 | 65 | 125 | 130 | 115 | 3.5 | Poor |
| 2 | 200 | 50 | 100 | 100 | 100 | 0.88 | Good |
| 3 | 135 | 40 | 70 | 80 | 60 | 0.76 | Good |
| 4 | 100 | 30 | 50 | 50 | 30 | 0.46 | Excellent |
| 5 | 50 | 10 | 20 | 20 | 10 | 0.25 | Excellent |

As is clear from Table 1, when the amounts of Si, P, Cr, B, and S incorporated in the fuel electrode (the active portion thereof) are respectively 200 ppm or lees, 50 ppm or less, 100 ppm or less, 100 ppm or less, and 100 ppm or less (combinations 2, 3, 4, and 5), "percent reduction in power density" is extremely lowered, as compared with the case where the amounts of these additives do not fall within the above ranges (combination 1). Furthermore, when the amounts of Si, P, Cr, B, and S incorporated in the fuel electrode are respectively 100 ppm or lees, 30 ppm or less, 50 ppm or less, 50 ppm or less, and 30 ppm or less (combinations 4 and 5), "percent reduction in power density" is more extremely lowered, as compared with the case where the amounts of these additives do not fall within the above ranges (combinations 2 and 3).

The invention claimed is:

1. A solid oxide fuel cell comprising:
a porous fuel electrode which allows reaction of a fuel gas to proceed and which is formed of Ni and an oxygen-ion-conductive material;
a porous air electrode which allows reaction of an oxygen-containing gas to proceed; and
a dense solid electrolyte membrane which is provided between the fuel electrode and the air electrode and which has an interface with the fuel electrode;
wherein, in the fuel electrode, which has been subjected to reduction treatment, Ni grains present in a region located within 3 µm from the interface have a mean size of 0.28 to 0.80 µm, grains of the oxygen-ion-conductive material present in the region have a mean size of 0.28 to 0.80 µm, and pores present in the region have a mean size of 0.10 to 0.87 µm.

2. A solid oxide fuel cell according to claim 1, wherein, in the fuel electrode, which has been subjected to reduction treatment, Ni grains present in the region and facing the solid electrolyte membrane have a mean size of 0.31 to 0.70 µm, grains of the oxygen-ion-conductive material present in the region and facing the solid electrolyte membrane have a mean size of 0.32 to 0.78 µm, and pores present in the region and facing the solid electrolyte membrane have a mean size of 0.15 to 0.80 µm.

3. A solid oxide fuel cell according to claim 1, wherein, in the fuel electrode, which has been subjected to reduction treatment, a ratio of the total volume of isolated Ni grains present in the region to the total volume of all the Ni grains present in the region is 40% or less.

4. A solid oxide fuel cell according to claim 1, wherein the fuel electrode and the solid electrolyte membrane are formed through co-firing.

5. A solid oxide fuel cell according to claim 1, wherein the oxygen-ion-conductive material is yttria-stabilized zirconia (YSZ).

6. A solid oxide fuel cell according to claim 1, wherein the fuel electrode has a two-layer structure including an active portion, which is a layer in contact with the solid electrolyte membrane, and a collector portion, which is the remaining portion of the fuel electrode and is a layer having an oxygen-ion-conductive material content lower than that of the active portion; and
wherein the region is a portion of the active portion of the fuel electrode.

7. A solid oxide fuel cell according to claim 1, wherein the fuel electrode contains, as additives, silicon (Si), phosphorus (P), chromium (Cr), boron (B), and sulfur (S) in amounts of 200 ppm or less, 50 ppm or less, 100 ppm or less, 100 ppm or less, and 100 ppm or less, respectively.

* * * * *